Aug. 8, 1961 S. G. RAFTIS 2,995,335
COLLAPSIBLE VALVE APPARATUS
Filed April 26, 1957
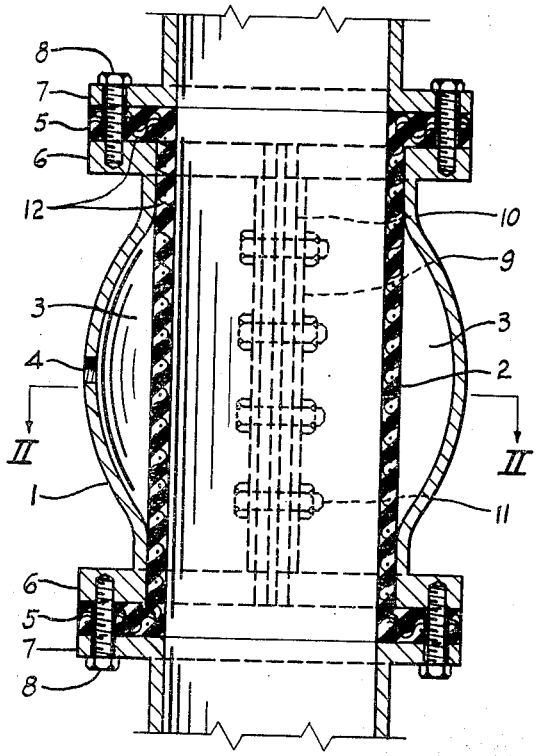
FIG. I
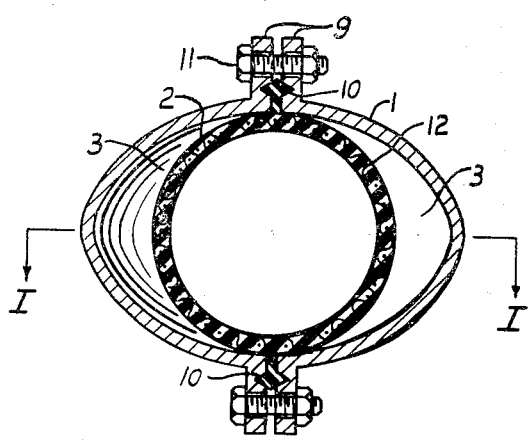
FIG. II
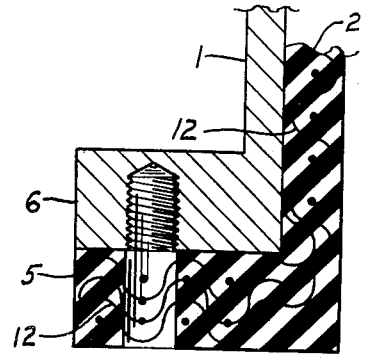
FIG. III
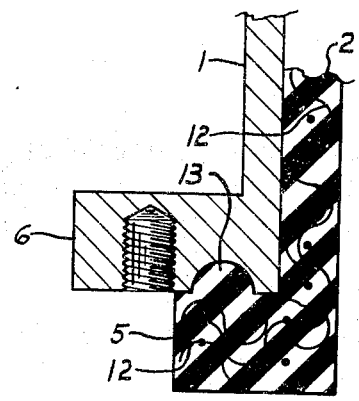
FIG. IV
INVENTOR
SPIROS G. RAFTIS
BY Lloyd F. Engle, Jr.
ATTORNEY 2,995,335
COLLAPSIBLE VALVE APPARATUS
Spiros G. Raftis, Mount Lebanon Township, Allegheny County, Pa. (1277 Cedar Blvd., Pittsburgh 28, Pa.)
Filed Apr. 26, 1957, Ser. No. 655,335
3 Claims. (Cl. 251—5)

This invention relates to a collapsible valve apparatus. More particularly, this invention is concerned with apparatus of the collapsible valve type which is pneumatically or hydraulically operated to regulate the flow of fluidized solids.

Certain of the collapsible valve apparatuses in prior use in the art have comprised a cylindrical housing or casing concentrically surrounding a flexible sleeve, generally constituted of rubber, either in engaging or non-engaging relation, and each said housing and sleeve having radial flanges extending laterally outward in engaged relation at each end thereof. Obviously, it will be seen that when the flexible sleeve is either partially or totally collapsed upon the stream of fluidized solids flowing therethrough, a force is exerted longitudinally on the sleeve by the pressure of the said stream which must be reacted, if at all, upon the outwardly extending flanges of the sleeve which are engaged between the casing flange and a companion flange. This longitudinal force, being repeatedly appleid to the flanges of the flexible sleeve, ultimately caused a failure or a rupture of the said sleeve at or near the shoulder where the flange connected to the body of the sleeve, thereby terminating the usable life of the sleeve far in advance of any failure or deterioration occurring in the collapsible working portion of the sleeve.

I have preceived that this failure of the flexible sleeve at the shoulder can be overcome by reinforcing the flexible sleeve, and most particularly in the area of the flange and shoulder, with cording or mesh, very much in the same order as in the construction of tire casings.

The flexible sleeve, so constructed in this embodiment of my invention, possesses outstanding circular flanges at each end which are of considerable stiffness and rigidity, and, consequently, can not be compressed as could the flanges of the flexible sleeves in prior use in the art. Therefore, the casing of the valve embodying my invention is not a circumferentially continuous cylinder, as in the valves of this type in prior use in the art, but rather is split longitudinally into two halves or a multiplicity of sections which fit between the reinforced outstanding circular flanges of the sleeve, and are fastened together to enclose the body thereof and form an enclosed chamber in cooperation therewith, into which the operating means, either gas or liquid, is injected.

Certain other of the collapsible valve apparatuses in prior use in the art have comprised a basically cylindrical housing or casing surrounding a flexible sleeve, generally constituted of rubber, the said casing circumferentially engaging the said sleeve at the ends thereof, and being circumferentially expanded in its central portion, thereby constituting a chamber for receiving the operating means between the said casing and the central portion of the said sleeve. In this form of collapsible valve, the pressure of the stream of fluidized solids upon the collapsed sleeve caused the said sleeve to creep longitudinally within the said casing, and eventually the said sleeve was moved longitudinally the minute distance necessary to destroy the seal between the said sleeve and the said casing, thus rendering the said valve inoperable.

One object of my invention is to provide a collapsible valve for regulating the flow of fluidized solids with a flexible sleeve, having reinforcement particularly in the flange and shoulder areas thereof, to increase the useful life of the said valve by eliminating failures of the said sleeve from the longitudinal forces applied by the stream of fluidized solids.

A further object of my invention is to provide a collapsible valve for regulating the flow of fluidized solids, having a casing which is longitudinally divided to facilitate assembly around a flexble sleeve having relatively rigid reinforced flanges.

A still further object of my invention is to provide a collapsible valve, having a flexible sleeve which can not creep longitudinally under the force exerted by the stream of fluidized solids flowing therethrough and being regulated thereby.

Further and additional objects will appear from the following description and the appended claims.

Referring now to the drawings:

FIG. I is a longitudinal cross-sectional view through one form of my collapsible valve apparatus taken in the plane of section line I—I of FIG. II.

FIG. II is a lateral cross-sectional view through one form of my collapsible valve apparatus taken in the plane of section line II—II of FIG. I.

FIG. III is an enlarged cross-sectional view through the flange and shoulder area of one form of my collapsible valve apparatus without the companion flange and connecting bolt in place.

FIG. IV is an enlarged cross-sectional view through the flange and shoulder area of another form of my collapsible valve apparatus without the companion flange and connecting bolt in place.

The numeral 1 indicates a casing surrounding a basically cylindrical flexible sleeve 2. The casing 1 is of circular cross-section at its ends and has opposing bulges in its center portion, thereby forming a pair of chambers 3 separated by the said flexible sleeve 2 when it is in fully opened condition, however, fluid communication is provided between the chambers about the periphery of the sleeve. The said sleeve 2 has an inside diameter approximately equal to the inside diameter of any particular pipe with which the valve embodying my invention is employed. An inlet 4 in one of the said bulges is provided for the injection of a gas or liquid under pressure into the said chambers 3 concurrently, thereby compressing the said sleeve 2 and restricting the flow of fluidized solids therethrough. The said inlet 4 also acts as an outlet for the gas or liquid to be discharged from the said chambers 3 when it is desired to open the valve. A circular flange 5 extends radially outward at the ends of the said sleeve and is rigidly engaged between the circular flanges 6 of the casing 1 and the companion pipe flanges 7 by the clamping action of a plurality of bolts 8. The casing 1 is constructed in two symmetrical parts, divided longitudinally, each portion being provided with longitudinal radially extending flanges 9 which cooperate with sealing strips 10 to form a fully sealed casing through the clamping action of a plurality of bolts 11 engaging the said flanges 9 on the separate portions of the casing 1. The sealing strips 10 indicated in the drawings are basically rhombic in cross-section and cooperate with corresponding receptacles in the flanges 9, but I have also employed flat sealing strips which cooperate with flat longitudinal flanges. Corded reinforcing 12 is molded into the rubber of the sleeve 2 and the layers and strands of the corded reinforcing 12 are increased in the flange 5 and the shoulder area of the sleeve 2.

In one form of my invention, an annular boss 13 is provided on the flange 5 of the sleeve 2 which cooperates with an annular receptacle on the engaging face of the flange 6, thereby affixing the sleeve 2 more rigidly to the casing 1.

In another form of my invention, the casing 1 is of cylindrical cross-section throughout its length, but of increasing diameter toward the midpoint of its length, thereby resulting in a single circumferentially continuous chamber 3 between the casing 1 and the sleeve 2, rather than the separate opposed chambers existing in the form of my invention described hereinbefore. FIG. I of the drawings would also illustrate this form of my invention.

In still another form of my invention, the casing 1 is of uniform cylindrical cross-section throughout its length, but has an inside diameter greater than the outside diameter of the sleeve 2. This form of my invention is not illustrated in the drawings.

In actual practice, a pressure is maintained in the chamber or chambers 3, equal to the pressure in the stream of fluidized solids flowing through my valve when it is in fully open position. Consequently, my valve can be utilized in systems having a broad range of pressures without subjecting the flexible sleeve 2 to any undue radial stress; the only limitation thereto being the ability of the casing 1 to withstand the necessary pressure. In this connection, I have provided casings capable of withstanding internal pressures up to 900 pounds per square inch, and there is no reason why casings could not be provided, within the scope of my invention, to withstand internal pressures far in excess of that amount.

Collapsible valve apparatuses embodying my invention have been successfully employed in installations with pipe sizes from one (1) inch in diameter to eighteen (18) inches in diameter. However, the installations of the larger diameters are less frequent in actual practice, and the majority of applications lie in the range from one (1) inch to twelve (12) inches in diameter.

Briefly to explain the features of a collapsible valve apparatus embodying my invention, I provide a cylindrical flexible sleeve having relatively rigid circular outstanding radial flanges at each end. The said sleeve is reinforced with corded fabric, and the quantity of the said corded fabric is increased substantially in the said flanges and also in the shoulder areas where the said flanges join the body of the said sleeve. A casing is made in two or more longitudinally joinable sections to fit between the said flanges of the said sleeve, and to completely surround the body of the said sleeve, engagingly at the ends of the said casing and non-engagingly in its central portion, by virtue of the circumferentially expanded construction of the said central portion of the said casing, thereby creating an airtight chamber or chambers between the said sleeve and the said casing at the said central portion thereof. There is an inlet into the said chamber or chambers, through the wall of the said casing, through which fluid or gas under pressure is injected into the said chamber or chambers to compress or collapse the said sleeve, or through which a portion of the said fluid or gas is ejected to permit the opening of the said sleeve.

When my collapsible valve apparatus is completely assembled and installed for actual use, the relatively rigid radial end flanges of the flexible sleeve are firmly engaged between the end flanges of the casing and the companion flanges of the pipe with which my valve is used. It will be seen that this end joinder, along with the joinder of the longitudinal flanges of the casing sections, completes the formation of an airtight chamber or chambers between the inner surface of the casing and the outer surface of the cylindrical sleeve, in the area of their corresponding central portions.

When my valve is used in relatively low pressure lines, I have found that locally present sources of activating air pressure or fluid pressure are often suitable for connection to the inlet 4. When installation in relatively high pressure lines is to be achieved, it is generally necessary to provide a high pressure source for the air or fluid to be injected at the inlet 4. It should be noted, however, that even though a high injection pressure is required in high pressure line installations, still the differential pressure across the sleeve, which is necessary to accomplish partial stricture, is relatively slight. I have found that the differential pressure across the sleeve which is necessary to accomplish complete stricture is approximately fifty percent (50%) of the line pressure; that is to say, in an installation having a line pressure of six hundred (600) pounds per square inch, complete stricture of the valve is accomplished with a chamber pressure of nine hundred (900) pounds per square inch.

Obviously, the benefits to be derived from my valve have not been available in the collapsible valves in prior use in the art, for the reason that rigid radial end flanges on the sleeve could not be inserted through the continuous cylindrical casings which were invariably used. Consequently, the flanges on sleeves in prior use in the art had to be made flexible, in order that they could be distorted sufficiently to pass through the continuous cylindrical casings.

Certain changes may be made in the arrangement set forth in the specification and shown in the drawings, it being understood that modifications in the precise embodiment of the invention may be made within the scope of the following claims without departing from the spirit of the invention.

I claim as my invention:

1. A collapsible valve apparatus comprising a basically cylindrical, open-ended, flexible sleeve having relatively rigid outstanding circular end flanges and corded reinforcing molded into the said sleeve, the said corded reinforcing being increased in quantity and density in the said circular end flanges of the said sleeve and in the shoulders where the said circular end flanges join the cylindrical body of the said sleeve, a plurality of longitudinally joined casing shells surrounding the cylindrical body of the said sleeve in spaced relation thereto and having outstanding end flanges uniformly engaging the back surface of the said circular end flanges of the said sleeve, corresponding flat longitudinal joining flanges on the said casing shells cooperating engagingly with sealing strips therebetween, and means for injecting operating fluid under pressure into the resultant space between the said flexible sleeve and the said longitudinally joined casing shells.

2. A collapsible valve apparatus comprising a basically cylindrical, open-ended, flexible sleeve having relatively rigid outstanding circular end flanges and corded reinforcing molded into the said sleeve, the said corded reinforcing being increased in quantity and density in the said circular end flanges of the said sleeve and in the shoulders where the said circular end flanges join the cylindrical body of the said sleeve, a plurality of longitudinally joined casing shells surrounding the cylindrical body of the said sleeve engagingly at the ends thereof and in spaced relation in the central portion thereof and having outstanding end flanges uniformly engaging the back surface of the said circular end flanges of the said sleeve, corresponding flat longitudinal joining flanges on the said casing shells cooperating engagingly with sealing strips therebetween, and means for injecting operating fluid under pressure into the resultant space between the said flexible sleeve and the said longitudinally joined casing shells.

3. A collapsible valve apparatus comprising a basically cylindrical, open-ended, flexible sleeve having relatively rigid outstanding circular end flanges and corded reinforcing molded into the said sleeve, the said corded reinforcing being increased in quantity and density in the said circular end flanges of the said sleeve and in the shoulders where the said circular end flanges join the cylindrical body of the said sleeve, two casing shells joined longitudinally to form a casing of basically cylindrical cross-section at each end and basically elliptical cross-section in its central portion and surrounding the cylindrical body of the said sleeve engagingly at the ends thereof and in variantly disposed spaced relation in the central portion thereof and having outstanding end flanges uniformly engaging the back surface of the said circular end flanges of the said sleeve, corresponding flat longitudinal joining flanges on the said casing shells cooperating engagingly with sealing strips therebetween, and means for injecting operating fluid under pressure into the resultant space between the said flexible sleeve and the said longitudinally joined casing shells.

References Cited in the file of this patent

UNITED STATES PATENTS

| | | |
|---|---|---|
| 2,112,592 | MacClatchie | Mar. 29, 1938 |
| 2,257,913 | Maranville | Oct. 7, 1941 |
| 2,434,835 | Colley | Jan. 20, 1948 |
| 2,716,575 | Vickers | Aug. 30, 1955 |
| 2,773,511 | Mercier | Dec. 11, 1956 |

FOREIGN PATENTS

| | | |
|---|---|---|
| 801,959 | Germany | of 1950 |
| 1,091,642 | France | of 1955 |